INVENTOR.
Richard E. Self
ATTORNEYS

United States Patent Office 3,451,404
Patented June 24, 1969

3,451,404
HIGH ENERGY LOSS FLUID CONTROL
Richard E. Self, 3121 Brimhall Drive,
Los Alamitos, Calif. 90720
Filed Dec. 5, 1966, Ser. No. 599,229
Int. Cl. F15d 1/04
U.S. Cl. 137—14                                     9 Claims

ABSTRACT OF THE DISCLOSURE

A method of, and a device such as a valve for, high energy loss fluid control by subdividing high pressure fluid flow into a plurality of individual streams throughout a substantial length of travel along fixed frictional drag surfaces of passageways having long length to diameter ratios and within which the streams are subjected to frictional drag energy losses along said surfaces which turn the streams and substantially increase the length of frictional drag energy losses as compared to straight lines between the inlet and outlet ends of the passageways. The passageways may be ducts in a valve controlling plug member wherein the ducts have one of their ends at one end of the plug member and their opposite ends along the perimeter of the plug member with angular portions of the duct intermediate the ends thereof.

---

This invention relates to the control of a flowing fluid under conditions requiring high energy losses in passing through a particular passage or portion of a passage.

In the handling of flowing fluids, it has been customary for high energy losses or high pressure drop at a particular point in the fluid passage, to utilize orifice means affording a high velocity short throat section. If the fluid is liable to flash, that is, vaporize or turn to gaseous condition on the downstream side of the orifice or orifices, it may condense implosively downstream from the orifice and induces damaging shock waves and cause erosion of the apparatus. For example, where the flashing fluid is hot water, it will flash or cavitate to steam as it passes through the high velocity section or throat of the orifice or orifices and may then recondense to water downstream with implosive action, resulting in energy losses and inducing high energy shock waves that may severely damage and erode the downstream section of a valve or pipe associated with the pressure drop means.

An important aim of the present invention is to effect energy losses in a flowing fluid without high velocity and shock wave reaction, thus avoiding damage and erosion in the equipment.

Another object of the invention is to provide novel method of and means for effecting desirable non-damaging energy losses by subjecting the flowing fluid to frictional drag through long, small diameter ducts.

A further object of the invention is to provide a novel energy loss method and means for flowing fluids liable to flashing on passing through the pressure drop orifices and according to which flashing is avoided while attaining the desired energy losses.

Still another object of the invention is to provide smooth flow high energy loss fluid control readily adaptable for use in control valves.

Figure 1:
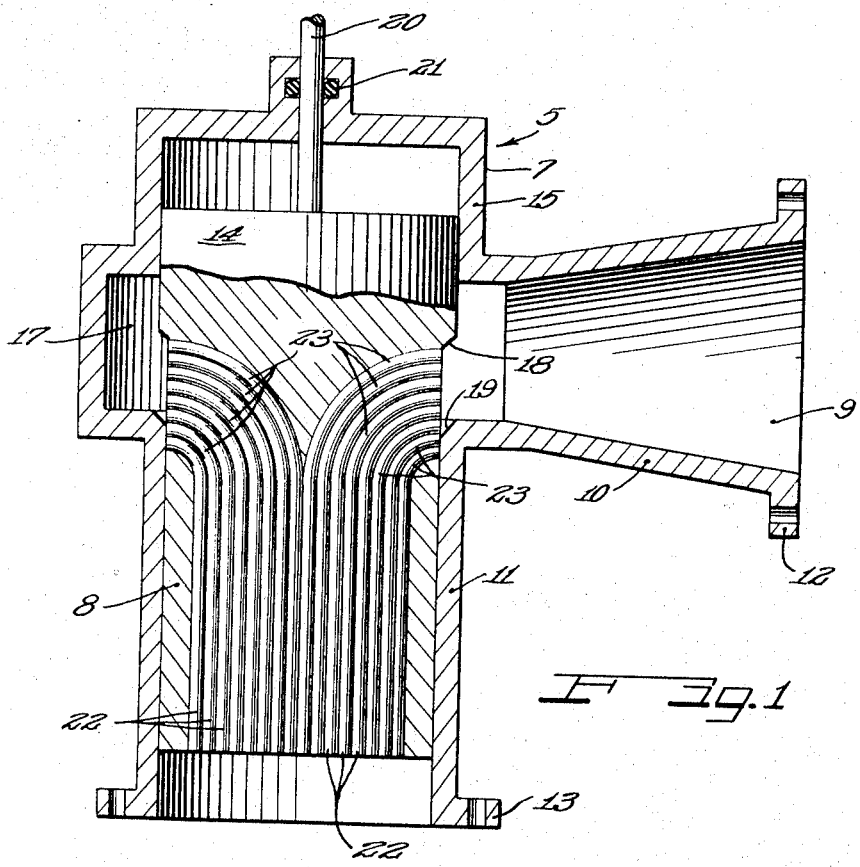
Figure 2:
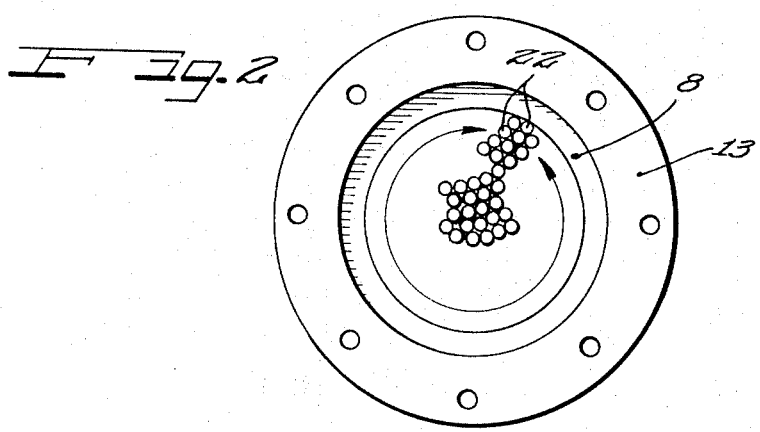

Other objects, features and advantages of the present invention will be readily apparent from the following detailed description of certain preferred embodiments thereof taken in conjunction with the accompanying drawings; in which:

FIGURE 1 is a longitudinal sectional detail view taken through a high energy loss fluid control device in the form of a valve; and FIGURE 2 is an end view of the device of FIGURE 1 looking upwardly.

According to the present invention, high energy loss control of fluid flowing through a passage of substantial cross-sectional flow area is attained by subdividing and confining the fluid in a portion of said passage to flow as a plurality of individual streams throughout a substantial length of travel, and subjecting the individual streams to friction drag energy losses.

Means for this purpose conveniently comprise a valve housing and a plug which are relatively movable to determine the number of individual streams into which the fluid is divided. The dividing means comprise a plurality of ducts of small cross-sectional flow area. In one application of the principles of the invention, a control valve assembly 5 includes a valve housing 7 defining the fluid passage and a valve plug 8 (FIGS. 1 and 2) mounted between the opposite ends of the passage.

In the depicted construction, the valve housing 7 has a generally L-shaped configuration in which a fluid passage 9 extends through angularly related portions 10 and 11 having respective flanges 12 and 13 at their open ends by which the housing is adapted to be secured in fluid-tight communication with the ends of conduits such as pipes, boiler or tank flanges, and the like, providing part of or continuations of the passage 9 in a flow system.

In the depicted operative arrangement, the valve plug 8 is in the form of a cylindrical plug reciprocably mounted in the valve housing portion 11 which is of complementary internal cylindrical shape and slidably guides the valve plug in its position across the juncture between the respective end portions of the fluid passage through the housing portions 10 and 11.

To serve as a shutoff valve, the valve plug 8 has a head portion 14 slidably guided in a complementary head extension 15 of the housing aligned with the housing passage portion 11. The valve head 14 is of a length slightly greater than the length of an encompassing chamber 17 defined by the housing at the inner end of the passage portion 10 of the housing concentric with the passage portion 11. For shutoff, the valve plug 8 is moved inwardly to engage an annular valve shoulder 18 on the inner end of the head 14 with a complementary valve seat 19 defining the inner end of the section of the passage within the housing portion 11. For effecting such movement, the valve head 14 desirably has projecting therefrom a valve stem 20 extending through a packing gland 21 in the end of the head chamber 15. Any suitable means (not shown) may be provided for actuating the valve stem 20 and thereby the valve body manually or mechanically, automatically, on signal, and the like, as preferred. Between the fully closed and fully open positions of the valve head 14 volume control of the fluid flowing through the passage 9, in either direction, is accomplished.

To attain energy losses to the flowing media without damaging velocities and abrupt pressure drop, means are provided in the valve plug 8 for subdividing the fluid passing through the passage 9, in either direction, into a plurality of individual streams. Such means comprise frictional drag energy loss ducts 22 which may be provided in any preferred manner and construction to extend between an area of suitable length on the perimeter of the valve plug 8 adjacent to the shoulder 18 and the end of the valve plug remote from such shoulder. For this purpose the valve plug between the shoulder 18 and the opposite or outer end is of suitable length to afford the desired substantial length for the ducts 22. While the ducts 22 may be drilled or cored through the valve plug, they may conveniently comprise a bundle of suitable number of tubes of small cross-sectional flow area. From the outer end of the valve plug 8, the duct 22 extends in parallel relation to suitable respective radius angular head end portions 23 having their open ends in the perimeter of the valve plug 8. The arrangement is such that the ducts 22 vary progressively in length radially inwardly from the perimeter of the valve plug 8, considered in the parallel relationship of the ducts. This results form the progressively greater distance of the arcuate head end portions 23 of the ducts which must extend from the parallel axes of the ducts to the head ends which open through the perimeter of the valve plug 8. Further, to reach the valve plug perimeter, the duct heads 23 are stacked such that the head ends of the ducts nearest the center of the valve plug open through the valve head perimeter nearest the shoulder 18, and progressively outwardly from the center the duct heads 23 are progressively shorter and progressively further removed from the shoulder 18, to the heads 23 of the outermost and thus shortest of the ducts 22 which communicate with the valve plug perimeter at the limit of the perimeter area remote from the shoulder 18 through which communication may be effected with the duct head ends when the valve is fully open. Through this arrangement, as the valve is gradually shifted toward the closing position so that the ducts 22 are progressively closed off from communication between the opposite ends of the passage 9 the length of travel through the remaining ducts of the progressively reduced volume of fluid substantially progressively increases to compensate for tendency toward increase in velocity of the reduced volume of fluid. Conversely, as the valve is progressively opened, exposing progressively greater number of friction ducts 22 to flow communication between the opposite ends of the passage 9, the length of the successively added ducts progressively decreases to compensate for the greater volume of fluid passing through the valve plug. Thereby, substantially uniform velocity is maintained in all linear adjustments of the valve.

Due to the substantial length and small cross-sectional flow area of the ducts 22 highly efficient frictional drag energy losses are attained free of abrupt pressure and velocity changes. This is of substantial advantage in controlling a fluid subject to flashing or cavitation, such as hot water, because as the fluid flows through and emerges from the ends of the ducts 20 it is free from abrupt pressure drop which would result in flashing or high velocities reactions. According to the principles of the present invention, the desired energy losses are confined to the long, small diameter, fixed frictional drag surfaces within the main-passage-subdividing, plural passageways afforded, in this instance, by the tubes 22. Within the passageways the high pressure flowing media streams are turned and the frictional drag energy losses substantially increased, as compared to straight line movement of the fluid between the opposite ends of the respective passageways.

In the more or less schematic showing of FIGURES 1 and 2, the valve housing has been shown as a one-piece structure, as has also the valve plug in each instance. It will be appreciated, however, that any preferred multi-part structure may be afforded in either the housing or the valve plug or both.

I claim as my invention:

1. A method of high energy loss fluid control, comprising:
    flowing a fluid under pressure through a passage of substantial cross-sectional flow area;
    in a portion of said passage subdividing and confining the fluid to flow as a plurality of individual streams throughout a substantial length of travel along fixed frictional drag surfaces of passageways having long length to diameter ratios;
    subjecting the individual streams to frictional drag energy losses along said surfaces; and
    within said passageways angularly turning said streams and substantially increasing the length of frictional drag energy losses along said surfaces as compared to straight line travel of the streams between the opposite ends of the respective passageways.

2. A method according to claim 1, comprising controlling the volume of flow through said passage by progressively diminishing or increasing the number of passageways through which the streams are permitted to flow.

3. A method according to claim 2, comprising progressively diminishing the length of the increasing number of streams during increase in flow volume and progressively increasing the lengths of the diminishing number of streams during decrease in flow volume.

4. In a high energy loss fluid control device:
    means defining a high pressure fluid passage of substantial cross-sectional flow area; and
    means in a portion of said passage comprising a plurality of individual fluid subdividing and confining passageways having respective fixed frictional drag surfaces therealong and a long length to diameter ratio between inlet and outlet ends of said passageways to impart high frictional drag losses to high pressure fluid flow therethrough;
    said passageways being angular intermediate their ends to provide a substantially longer fluid flow length within the passageways than a straight line distance between said inlet and outlet ends.

5. A high energy loss fluid flow control device according to claim 4, comprising means for controlling the volume of flow through said passage and being operative to progressively diminish or increase the number of passageways in communication with said passage.

6. A device according to claim 5, said passageways being of varying lengths, and said controlling means being operative to effect communication of the passageways in progressively diminishing lengths but increasing number of passageways to effect increase in flow volume, and progressively shutting off the diminishing length of passageways but permitting progressively increasing lengths of the passageways to remain in communication with the passage while diminishing the number of passageways during decreases in flow volume through the passage.

7. A device according to claim 4, said fluid passage defining means comprising a housing which has angularly related portions for said fluid passage, said means in a portion of said passage comprising a plug which is of elongated form and reciprocally mounted in one of said angularly related passage portions and has a head operable to close communication between said passage portions in one position of the valve plug, said passageways comprising a bundle of ducts which are angular along their lengths and open at one end through an end of the plug which is remote from said head and open at their opposite ends through the perimeter of the plug adjacent to said head.

8. A device according to claim 1, in which said ducts are of progressively varying lengths.

9. A device according to claim 7, said ends of the ducts which open through said perimeter being located in progressively spaced relation to said head corresponding to the position of the ducts in the valve plug from the center toward the periphery of the valve plug, said ducts having arcuate head end portions extending into the valve plug from said portion of the perimeter and throughout the remainder of their lengths the ducts being in parallel relation to one another between said head end portions and their ends at said remote end of the valve plug, and means for reciprocably actuating the valve plug to control the length of said peripheral portion exposed to communication of the head ends of the ducts opening therethrough to the fluid in the other of said passage portions.

References Cited

UNITED STATES PATENTS

| | | | |
|---|---|---|---|
| 1,111,244 | 9/1914 | Wilson | 137—625.37 X |
| 2,821,999 | 2/1958 | Cahen et al. | 251—362 X |
| 2,918,037 | 12/1959 | Curran | 137—625.3 |
| 2,939,672 | 6/1960 | Rich | 251—5 |
| 3,170,483 | 2/1965 | Milroy | 137—625.3 X |
| 3,316,936 | 5/1967 | Gongiver | 251—5 X |

FOREIGN PATENTS 1,075,011    4/1954    France.

ARNOLD ROSENTHAL, *Primary Examiner.*

U.S. Cl. X.R.

137—625.3, 625.38; 138—46